April 2, 1935.　　　　　C. I. McNEIL　　　　　1,996,734
ELECTRICAL APPARATUS
Filed March 23, 1933　　　2 Sheets-Sheet 1
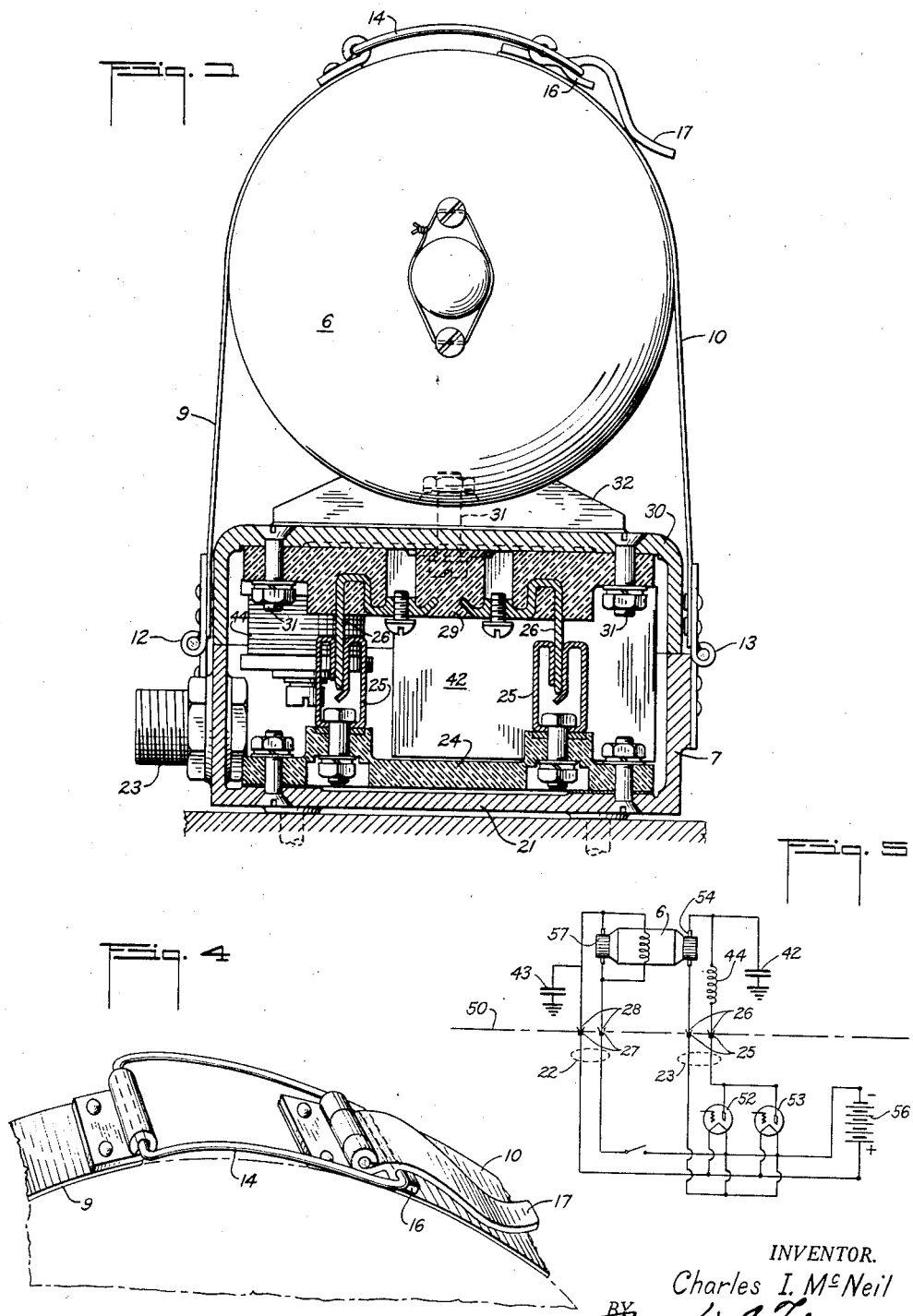
INVENTOR.
Charles I. McNeil
BY Martin J. Finnegan
ATTORNEY.

April 2, 1935.　　　　C. I. McNEIL　　　1,996,734
ELECTRICAL APPARATUS
Filed March 23, 1933　　2 Sheets-Sheet 2
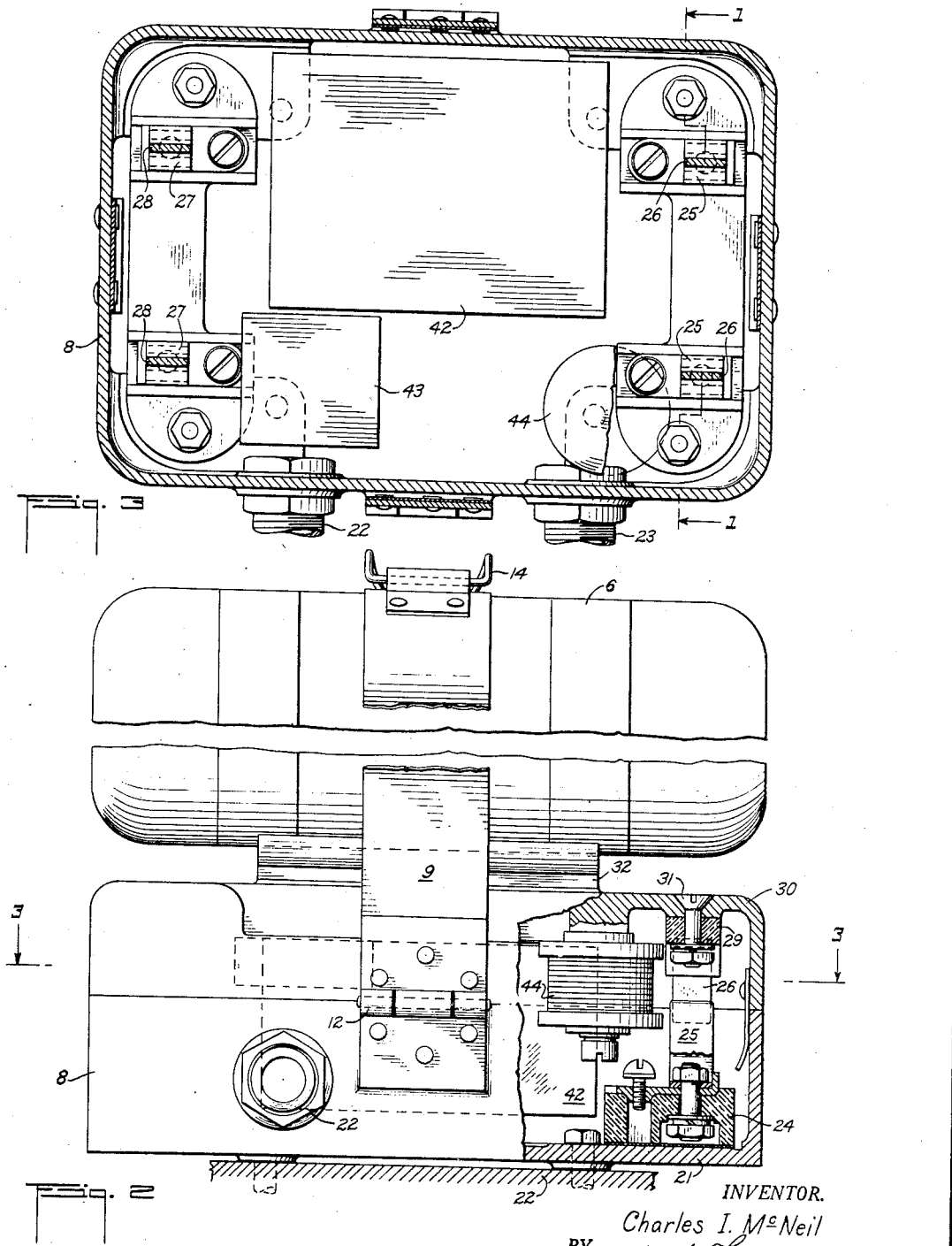
INVENTOR.
Charles I. McNeil
BY Martin J. Finnegan
ATTORNEY.

Patented Apr. 2, 1935

1,996,734

UNITED STATES PATENT OFFICE 1,996,734

ELECTRICAL APPARATUS

Charles I. McNeil, Bloomfield, N. J., assignor, by mesne assignments, to Eclipse Aviation Corporation, East Orange, N. J., a corporation of New Jersey Application March 23, 1933, Serial No. 662,359

5 Claims. (Cl. 171—97)

This invention relates to electrical apparatus and more particularly to means for generating electrical power.

One of the objects of the invention is to provide a novel housing and mounting means for a dynamo electric machine and associated apparatus. When applied to the power generating equipment for the radio and other apparatus used on airplanes, the invention provides means whereby the machine which generates current for use in the thermionic tubes of the radio set may be supported on and by the portion of the mechanism which houses the output regulating and current filtering means, as for example, condenser, choke coils, shielding and circuit controlling mechanism.

It is common practice for aircraft to carry a generator capable of energizing either or both the filament and plate elements of the vacuum tubes of a radio set, and in order to maintain the source of this energy reasonably free from alternating current components, and also at substantially constant voltage during the period required for transmission or receipt of messages, it is customary to employ various regulating and filtering devices, which must be housed and supported in one or more units additional to the unit constituted by the dynamo electric machine itself. As a result it is necessary to provide suitable supports upon the plane for each of these units, as well as the necessary space therefor.

The paucity of unutilized space on aircraft, as well as the necessity for keeping the weight increments due to auxiliary apparatus within a minimum figure, has heretofore constituted a great obstacle to the installation and proper operation of radio apparatus of the character above described, and it is accordingly an object of the present invention to eliminate some of this difficulty by combining the generator and associated control unit in such a manner that the generator is supported entirely on and by the control unit, so that the only support which it is necessary to provide on the frame itself is a single support or base to receive the base of the control unit.

A further object of the invention is to provide a control unit of novel construction, including a base permanently attached to the frame of the engine or craft and an upper section which supports the machine, said upper section and machine being readily detachable either separately or in one operation, so that other units may be readily substituted therefor.

These and other objects and features of the invention will become apparent upon consideration of the following detailed description, and upon reference to the accompanying drawings illustrating the preferred embodiment of the invention. It is to be understood, however, that the drawings are illustrative only, and are not intended as definitions of the limits of the invention, reference being had to the appended claims for such a definition of limits.

In the drawings,

Fig. 1 is a view, partly in elevation and partly in transverse section of the preferred embodiment of the invention;

Fig. 2 is a view, partly in elevation and partly in section, at right angles to the viewpoint of Fig. 1;

Fig. 3 is a view in horizontal section along the line 3—3 of Fig. 2;

Fig. 4 is a view in perspective of certain details shown in elevation in Fig. 1; and Fig. 5 is a schematic representation of the electrical parts and connections involved in the embodiment illustrated in Figs. 1 to 4.

Referring to the drawings, the invention is shown as embodied in a dynamotor 6 of substantially cylindrical outline, and removably secured to the lower half 7 of a control unit 8 by the provision of a pair of straps 9 and 10 hinged on the sides of the unit 8, as indicated at 12 and 13 respectively, the two straps being adapted to extend over the upper surface of the dynamotor 6, into a position in which the link or coupling 14 on the end of the strap 9 engages a holding portion 16 of the latch 17 secured to the end of the strap 10.

As shown, the lower half 7 of the control unit 8 includes a base portion 21 permanently secured to the frame of the engine or fuselage of the craft, inlet and outlet plugs 22 and 23 respectively, a terminal board 24 of insulation material, a plurality of switch plates 25 and 27 mounted at either end of said terminal board, and a corresponding number of switch blades 26 and 28 embedded in a second terminal board 29 secured to the upper detachable portion 30 of the control unit in proper position to align with and engage the switch plates 25. As shown the upper terminal board 29 is held by suitable fastening means 31 to the upper section 30 of the box 8, and through this section there also extends fastening means 31 for holding in place a saddle 32 in which the dynamotor 6 is received and supported.

The receptacle 8 may include condenser units 42 and 43, a choke coil 44, and additional electrical units (not shown) for regulating the output of the dynamotor 6, as for example, additional filters, resistance units or voltage regulators.

When the dynamo electric machine is of the dynamotor type, as shown in Fig. 5, it is preferably energized from a battery 56 or other suitable relatively low voltage source, and in turn supplies current at a considerably higher voltage to a load 52, 53, the electrical connections being as indicated in Fig. 5, wherein the reference characters 22 to 28 inclusive, 42, 43 and 44 are being applied in said figure to indicate the parts similarly designated in Figs. 1 to 3. Also in Fig. 5 reference character 50 designates a dividing line between the electrical parts which are detachable when the upper section 30 of the receptacle 8 is removed, the parts indicated below the reference line 50 being those which are not so removable, as for example, the outlets 22 and 23, the fixed terminals 25 and 27, and the radio tubes 52, 53 in circuit with the brushes 54 on the generator side of the dynamotor 6. In the embodiment shown battery 56 supplies energy to heat the filaments of the radio tubes 52, 53 as well as supplying the current to energize the motor end 57 of the dynamotor 6.

It will be noted that the electrical parts are completely enclosed in a metal covering so that the whole constitutes a completely shielded system, thus protecting the parts against inductive radiation.

Other details of the dynamotor 6 have not been shown as it is to be understood that this unit may be of any desired construction, or may be replaced by a generator driven mechanically from the associated engine, instead of in the manner indicated in Fig. 5.

There is thus disclosed an embodiment of the present invention which, by reason of the compactness and the utilization of one of the units to support the other, is decidedly advantageous for use in installations wherein economy of space and elimination of as much weight as possible are desiderata. A further advantage is the readiness with which the upper section 30 and the unit 6 may be removed from the lower portion 7 of the unit 8 whenever inspection of the parts or substitution of new parts is desired.

Although the embodiment of the invention herein shown is obviously of considerable practical merit for many reasons, including those above enumerated, it is to be understood that the invention is not limited to the incorporation of the details shown, nor is it limited to the use herein suggested, except insofar as limitations in these respects are expressed in the broadest of the appended claims.

What is claimed is:

1. In a device of the class described, a casing having upper and lower registering sections, a terminal block secured to each section, registering current conducting elements extending from each of said blocks toward the other, a dynamo electric machine in circuit with said current conducting elements, a supporting saddle for said dynamo electric machine, means for securing said saddle to said upper casing section, and means extending around said dynamo electric machine for holding said upper and lower sections in registry.

2. In combination with a dynamo electric machine and an associated circuit having separable connectors forming a part thereof, a casing having registering upper and lower sections, the former of which receives said machine, and releasable means secured to the lower section for retaining said machine in position upon said upper section, said means having the additional function of holding said connectors against separation.

3. In combination with a dynamo electric machine and an associated circuit having a connector element forming a part thereof, a control device also forming a part of said circuit, a member supporting said dynamo electric machine, a pair of strap elements adapted, when coupled, to hold said dynamo electric machine in position upon said supporting member, means for suspending said control device and connector element from said supporting member, and a complemental connector element adapted to receive and remain inseparable from said first named connector element so long as said strap elements are coupled.

4. In combination with a dynamo electric machine and an associated circuit having a connector element forming a part thereof, a control device also forming a part of said circuit, a member supporting said dynamo electric machine, a pair of strap elements adapted, when coupled, to hold said dynamo electric machine in position upon said supporting member, means for suspending said control device and connector from said supporting member, and means for anchoring the unjoined ends of said strap elements, said anchoring means including a casing constituting a housing for said control device and connector.

5. In combination with a dynamo electric machine and an associated circuit having a connector element forming a part thereof, a control device also forming a part of said circuit, a member supporting said dynamo electric machine, a pair of strap elements adapted, when coupled, to hold said dynamo electric machine in position upon said supporting member, means for suspending said control device and connector from said supporting member, means for anchoring the unjoined ends of said strap elements, and a complemental connector element mounted on said anchoring means in position to receive said first-named connector element.

CHARLES I. McNEIL.